(12) United States Patent
Kurachi et al.

(10) Patent No.: US 7,273,668 B2
(45) Date of Patent: Sep. 25, 2007

(54) GLASS COMPOSITION INCLUDING ZIRCONIUM, CHEMICALLY STRENGTHENED GLASS ARTICLE, GLASS SUBSTRATE FOR MAGNETIC RECORDING MEDIA, AND METHOD OF PRODUCING GLASS SHEET

(75) Inventors: Junji Kurachi, Osaka (JP); Akihiro Koyama, Osaka (JP)

(73) Assignee: Hoya Corporation, Tokyo (JP)

( * ) Notice: Subject to any disclaimer, the term of this patent is extended or adjusted under 35 U.S.C. 154(b) by 354 days.

(21) Appl. No.: 10/860,713

(22) Filed: Jun. 3, 2004

(65) Prior Publication Data

US 2005/0003136 A1    Jan. 6, 2005

(30) Foreign Application Priority Data

Jun. 6, 2003  (JP) ............... 2003-161661

(51) Int. Cl.
*G11B 5/82* (2006.01)
*C03C 3/087* (2006.01)

(52) U.S. Cl. ................... 428/846.9; 501/70
(58) Field of Classification Search ............ 501/70, 501/67; 428/846.9
See application file for complete search history.

(56) References Cited

U.S. PATENT DOCUMENTS 5,900,296 A   5/1999  Hayashi et al.
6,114,039 A * 9/2000  Rifqi ............... 428/410
6,297,182 B1 * 10/2001 Maeda et al. ........ 501/66

FOREIGN PATENT DOCUMENTS

| JP | 9-2836     |   | 1/1997  |
|----|------------|---|---------|
| JP | 2837134    |   | 10/1998 |
| JP | 11-180727  | * | 6/1999  |
| JP | 11-180728  | * | 6/1999  |
| JP | 11-310433  | * | 11/1999 |
| JP | 2000319036 | * | 11/2000 |
| JP | 2004043295 | * | 2/2004  |

* cited by examiner

*Primary Examiner*—Karl Group
(74) *Attorney, Agent, or Firm*—Hamre, Schumann, Mueller & Larson, P.C.

(57) ABSTRACT

The present invention provides a glass composition that has excellent heat resistance and ion exchange ability and can be provided with high strength by a chemical strengthening treatment through an ion exchange. This glass composition includes, in terms of mass %: 59 to 68% of $SiO_2$; 9.5 to 15% of $Al_2O_3$; 0 to 1% of $Li_2O$; 3 to 18% of $Na_2O$; 0 to 3.5% of $K_2O$; 0 to 15% of $MgO$; 1 to 15% of $CaO$; 0 to 4.5% of $SrO$; 0 to 1% of $BaO$; 0 to 2% of $TiO_2$; and 1 to 10% of $ZrO_2$. The glass composition of the present invention is suitable for a glass substrate for magnetic recording media and also can be formed as a chemically strengthened glass article through an ion-exchange treatment.

4 Claims, No Drawings

US 7,273,668 B2

GLASS COMPOSITION INCLUDING ZIRCONIUM, CHEMICALLY STRENGTHENED GLASS ARTICLE, GLASS SUBSTRATE FOR MAGNETIC RECORDING MEDIA, AND METHOD OF PRODUCING GLASS SHEET

BACKGROUND OF THE INVENTION

1. Field of the Invention

The present invention relates generally to a glass composition that has high heat resistance and can be strengthened to a considerably higher degree by a chemical strengthening treatment involving an ion exchange, and a glass article including the glass composition, particularly a glass substrate useful for magnetic recording media. Furthermore, the present invention also relates to a method of producing a glass sheet that has high heat resistance and can have high mechanical strength provided by a chemical strengthening treatment involving an ion exchange.

2. Related Background Art

Glass has excellent properties such as, for instance, high surface smoothness and high surface hardness. Hence, glass is suitable for substrates for information recording media to be used in, for example, hard disk drives (magnetic recording devices; hereinafter referred to as "HDD").

Glass, however, has the disadvantage that it is easily broken or cracked. As a countermeasure against this, conventionally, a compression stress is given to the surface of glass through quenching or an ion exchange, that is to say, a so-called strengthening treatment is conducted. Of such strengthening treatments, a chemical strengthening treatment that is conducted through an ion exchange is suitable for materials to be used for substrates requiring particularly high dimensional accuracy because it causes much less glass deformation during the strengthening as compared to other strengthening treatments.

Recently, there is a trend to increase further the recording density of information recording media. In order to achieve a higher recording density, a magnetic material to be formed on a substrate is provided with an increasingly complicated layer structure. Furthermore, in order to provide the magnetic material with advanced characteristics, when a magnetic material layer is formed on a substrate, the substrate must be heated to a high temperature. A perpendicular magnetic recording system has been expected to be mainstream for the information recording method from now on. However, when a magnetic material for perpendicular magnetic recording is formed, the substrate must be heated to a considerably higher temperature (400° C.) than that conventionally employed.

JP2837134B discloses a glass substrate for information recording that is characterized in being formed of a chemically strengthened glass obtained through an ion-exchange treatment of a glass intended to be chemically strengthened. The ion-exchange treatment is carried out in a treatment bath containing Na ions and/or K ions. The glass intended to be chemically strengthened contains, in terms of weight percentage, 62% to 75% of $SiO_2$, 5% to 15% of $Al_2O_3$, 4% to 10% of $Li_2O$, 4% to 12% of $Na_2O$, and 5.5% to 15% of $ZrO_2$, wherein a weight ratio of $Na_2O/ZrO_2$ is 0.5 to 2.0 and a weight ratio of $Al_2O_3/ZrO_2$ is 0.4 to 2.5.

JP9-2836A discloses a glass substrate for magnetic disks obtained through a chemical strengthening treatment of a glass. The glass has a composition that essentially includes, in terms of weight percentage, 50 to 65 of $SiO_2$, 5 to 15 of $Al_2O_3$, 2 to 7 of $Na_2O$, 4 to 9 of $K_2O$, 12 to 25 of $MgO+CaO+SrO+BaO$, and 1 to 6 of $ZrO_2$, wherein the sum of $Na_2O$ and $K_2O$ is 7 to 14.

In recent HDDs, a magnetic recording medium is rotated at high speed and thereby its substrate is subjected to a great centrifugal force. Furthermore, it is necessary for a magnetic recording medium or a substrate for magnetic recording media to be able to withstand satisfactorily the impact that is caused by the collision of a recording head therewith when the magnetic recording medium or the substrate for magnetic recording media is included in a HDD that is operated with a so-called load-unload system (a ramp-load system). In this system a recording head is placed in a stand-by position while a magnetic recording medium is not rotated and the recording head is loaded thereon when it starts rotating. Accordingly, recent magnetic recording media are required to have higher strength than that of conventional magnetic recording media.

SUMMARY OF THE INVENTION

Hence, an object of the present invention is to provide a glass composition that tends neither to allow a glass surface to be roughened nor to allow the glass to be deformed even when a heat treatment is carried out at high temperatures in, for instance, a process for producing magnetic recording media, and that can be provided with high mechanical strength by a chemical strengthening treatment. Another object of the present invention is to provide a chemically strengthened glass article and a glass substrate for magnetic recording media that include such a glass composition, and a method of producing a glass sheet that includes the glass composition.

A glass composition of the present invention includes, in terms of mass %;

59 to 68% of $SiO_2$;
9.5 to 15% of $Al_2O_3$;
0 to 1% of $Li_2O$;
3 to 18% of $Na_2O$;
0 to 3.5% of $K_2O$;
0 to 15% of $MgO$;
1 to 15% of $CaO$;
0 to 4.5% of $SrO$;
0 to 1% of $BaO$;
0 to 2% of $TiO_2$; and
1 to 10% of $ZrO_2$.

From another aspect, the present invention provides a chemically strengthened glass article that is obtained by immersing a glass article including the above-mentioned glass composition in a molten salt containing monovalent cations whose ionic radius is larger than that of Na ions to cause an ion exchange between the Na ions contained in the glass article and the monovalent cations. From still another aspect, the present invention provides a glass substrate for magnetic recording media that includes the glass composition. From yet another aspect, the present invention also provides a chemically strengthened glass substrate for magnetic recording media that is obtained by subjecting the glass substrate to an ion exchange in the same manner as described above. From a further aspect, the present invention provides a method of producing a glass sheet by a float process. This producing method includes: blending raw materials for glass to obtain a molten glass including the respective components described above; and introducing the molten glass obtained by melting the raw materials onto a tin bath to form it in a sheet shape.

The glass composition of the present invention allows a glass formed thereof to be provided with higher mechanical strength by the chemical strengthening treatment. Furthermore, even when the glass is heated to high temperatures, the glass tends not to be deformed by heat and unevenness resulting from alkali eluted from the inside of the glass tends not to be formed on the surface thereof.

The glass article of the present invention makes it possible to reduce the probability of cracks occurring therein since the composition of the glass is determined within a predetermined range and the glass article has been subjected to the chemical strengthening treatment. Accordingly, the glass article can be provided with higher mechanical strength and higher reliability. Even when being subjected to high temperatures, the glass tends not to be deformed and protrusions tend not to be formed on the surface by alkali elution from the inside thereof.

The glass composition of the present invention may be processed into a predetermined shape such as, for instance, a disc shape to be used as a glass substrate for magnetic recording media. This glass substrate has high heat resistance and therefore tends not to be deformed even when being heated to a high temperature in forming a magnetic recording layer on the glass surface. Furthermore, the glass substrate tends not to allow protrusions that are caused by, for example, alkali elution to be formed on the surface thereof and thereby can maintain its mirror-finished smooth surface.

In addition, the glass has a thermal expansion coefficient that approximates that of metal, specifically stainless steel. Hence, even when the glass substrate is set on a metal rotational shaft of a HDD and is rotated at high speed, for instance, variations in its dimension resulting from the heat generated through the rotation as well as crack breakage resulting from vibration can be avoided.

A large glass sheet from which the glass substrate for magnetic recording media of the preset invention is obtained can be produced as follows. That is, its glass composition is determined within the specified range, and a working temperature and a devitrification temperature of the glass are selected so as to satisfy a predetermined relationship therebetween, whereby glass molten in a glass-melting furnace is introduced directly onto a tin bath to be formed into a sheet shape. This production method is excellent in production efficiency.

DETAILED DESCRIPTION OF THE INVENTION

Preferably, the glass composition of the present invention consists essentially of, in terms of mass %:

60 to 65% of $SiO_2$;
9.5 to 15% of $Al_2O_3$;
8 to 16% of $Na_2O$;
0 to 3.5% of $K_2O$;
2 to 5% of MgO;
3 to 7.5% of CaO;
0 to 4.5% of SrO; and
1 to 5% of $ZrO_2$, wherein the sum of $Na_2O$ and $K_2O$ is in the range of 11% to 18% (hereinafter referred to as "glass composition A"). The glass composition having this preferable glass composition A can be provided with higher mechanical strength more reliably by being subjected to the chemical strengthening treatment. Furthermore, even when the glass is heated to high temperatures, the glass further tends not to be deformed and unevenness resulting from alkali eluted from the inside of the glass can be prevented more reliably from being generated.

It is preferable that the glass composition of the present invention has a glass transition temperature of at least 590° C. With this glass composition, glass further tends not to be deformed even when being subjected to a heat treatment at high temperatures, for example, being heated in a molten salt to be chemically strengthened.

Preferably, the glass composition of the present invention has a thermal expansion coefficient of at least $70 \times 10^{-7}$/° C. as measured in the range of $-50°$ C. to 70° C. and a thermal expansion coefficient of at least $80 \times 10^{-7}$/° C. as measured in the range of 50° C. to 350° C. This glass composition has a thermal expansion coefficient that approximates that of a metal material. Hence, when it is bonded or joined to a metal, for example, the strain, displacement, or crack breakage of the glass resulting from the difference in the thermal expansion coefficient therebetween can be prevented from occurring.

The chemically strengthened glass article of the present invention is provided with a compression stress layer formed on the surface of the glass article and thereby has increased mechanical strength. Hence, the glass article can be prevented from being broken by a shock given from the outside.

The glass substrate for magnetic recording media of the present invention can maintain its smooth surface since even when the glass substrate is heated to a high temperature in forming a magnetic recording layer on the glass surface, the glass substrate tends not to be deformed, the substrate surface tends not to be roughened by heat, and unevenness on the substrate surface resulting from, for instance, alkali elution can be avoided.

It is preferable that the glass substrate for magnetic recording media of the present invention includes a glass composition having the glass composition A described above.

This glass substrate for magnetic recording media can maintain its smoother surface since even when the glass substrate is heated to a high temperature in forming a magnetic recording layer on the glass surface, the glass substrate further tends not to be deformed, the substrate surface further tends not to be roughened by heat, and unevenness on the substrate surface resulting from, for instance, alkali elution can be avoided more securely.

When a glass composition having a glass transition temperature of at least 590° C. is used for the glass substrate for magnetic recording media of the present invention, even if the glass substrate is heated in a molten salt when being chemically strengthened or even if the glass substrate is heated in forming a magnetic recording layer on the glass substrate, the glass substrate can be prevented from warping by heating. Furthermore, in a high temperature heating process such as, for instance, a process of forming a magnetic recording layer, protrusions on the glass surface resulting from, for example, alkali elution also can be avoided.

When a glass composition whose thermal expansion coefficient is within the above-mentioned range is used for the glass substrate for magnetic recording media of the present invention, the glass substrate has a thermal expansion coefficient that approximates that of a metal material, specifically stainless steel. Accordingly, when the glass substrate is set on a metal rotational shaft, which is made substantially of stainless steel, of a HDD and is rotated at high speed, the heat generated through the high-speed rotation tends not to cause variations in dimension and warping of the glass substrate. Hence, the glass substrate does not deviate from the rotational axis while rotating. Furthermore, problems tend not to occur, such as for instance, the head deviating from a correct position during a driving of disk.

The glass substrate for magnetic recording media of the present invention may be processed to have a circular outer shape in a plan view, more specifically, for instance, a doughnut (ring) shape.

The glass substrate for magnetic recording media of the present invention may be subjected to an ion-exchange treatment in the same manner as described above to be formed as a chemically strengthened glass substrate for magnetic recording media. This chemically strengthened glass substrate for magnetic recording media has a thick compression stress layer formed at the glass surface. Accordingly, it has high mechanical strength and thereby can be prevented from being broken by external force.

In the chemically strengthened glass substrate for magnetic recording media of the present invention, it is preferable that the load at which a crack develops with a probability of 50% when a diamond indenter of a micro Vickers hardness tester is pressed against the substrate is at least 800 g. With this chemically strengthened glass substrate for magnetic recording media, even when external force is exerted on the surface of the glass substrate to form an indentation thereon, the probability of vertically developing a crack around the indentation can be reduced.

Thus, even when the glass substrate gets minute scratches on the glass surface while the glass substrate is placed on a stainless steal supporting member to be moved or is transferred between jigs in a process of producing a magnetic recording layer on the surface of the glass substrate for magnetic recording media, the probability of developing cracks is low. Accordingly, the deterioration in strength of the glass substrate resulting from the development of cracks can be suppressed.

Furthermore, a HDD of the current mainstream, that is, one employing the ramp-load system, has a mechanism in which a head is placed in a stand-by position outside a medium when it is not operating and the head is loaded on the medium when it starts operating. Even if the head collides against the magnetic recording medium on being loaded on the medium when the HDD starts operating, the above-mentioned glass substrate that has been chemically strengthened can avoid cracks from developing therein and therefore allows a highly reliable HDD to be provided. Thus, the present invention can provide a magnetic recording medium to be used in the HDD that is operated with the ramp-load system, a substrate for the magnetic recording medium, and a glass composition for the substrate.

With the production method of the present invention, molten glass can be introduced directly onto a molten tin bath from a glass-melting furnace to be formed into a sheet shape. This makes it possible to obtain a large glass sheet that is used for obtaining the glass substrates for magnetic recording media having a specified thickness in large amounts.

In the production method of the present invention, it is preferable that raw materials for glass are blended to provide a molten glass having the glass composition A. This method can diminish the generation of unmelted or devitrified portions of the glass.

In the production method of the present invention, it is preferable that the glass sheet has a glass transition temperature of at least 590° C. This allows the glass sheet to have thermal stability securely at high temperatures.

In the production method of the present invention, it is preferable that the glass sheet has a thermal expansion coefficient in the above-mentioned range. This makes it possible to produce a large glass sheet that is suitable for the glass substrate for magnetic recording media.

Even in the case of a glass having a composition in which the content of $ZrO_2$ is in the range of 0% to 1%, when the other components are adjusted within the above-mentioned range, the glass can have a glass transition temperature of at least 590° C. as well as a thermal expansion coefficient of at least $70 \times 10^{-7}$/° C. as measured in the range of −50° C. to 70° C. and a thermal expansion coefficient of at least $80 \times 10^{-7}$/° C. as measured in the range of 50° C. to 350° C. The use of this glass prevents the glass substrate from having a surface roughened by heating or from being deformed, and allows the glass substrate to be provided with high mechanical strength through the chemical strengthening treatment.

However, as described earlier, media for perpendicular magnetic recording that have been expected to be mainstream from now on are heated to a very high temperature in the production process. Accordingly, a glass with higher heat resistance is required. Hence, in the present invention, the content of $ZrO_2$ is set at 1% or higher, preferably in the range exceeding 1% and thereby the heat resistance is improved.

With respect to the glass composition of the present invention, the reasons for limiting its composition are described below. In the following description, the unit "%" indicating the composition always denotes "mass %".

$SiO_2$ $SiO_2$ is a main component of the glass. When the content of $SiO_2$ is lower than 59%, the chemical durability of the glass deteriorates. In order to maintain the heat resistance of the glass, it is preferable that the content of $SiO_2$ is at least 60%.

On the other hand, a $SiO_2$ content exceeding 68% results in an increase in viscosity of the glass at high temperatures, which causes difficulty in melting and forming the glass. Hence, it is preferable that the content of $SiO_2$ is 68% or lower, particularly 65% or lower. Accordingly, the content of $SiO_2$ preferably is in the range of 59% to 68%, particularly in the range of 60% to 65%.

$Al_2O_3$ $Al_2O_3$ is an indispensable component for improving the heat resistance and chemical durability of the glass and facilitating chemical strengthening. When the minimum content thereof is set at 9.5%, not only high heat resistance can be obtained but also the strength of the glass that has been chemically strengthened can be maintained.

On the other hand, an $Al_2O_3$ content exceeding 15% results in a higher liquidus temperature of the glass and thereby deteriorates the formability of the glass to be formed in a sheet shape. Accordingly, it is preferable that the content of $Al_2O_3$ is in the range of 9.5% to 15%.

$Li_2O$ $Li_2O$ is a component that improves the strength of the glass, with its Li ions being substituted by other cations such as, for instance, Na ions or K ions in molten salt. $Li_2O$, however, has the disadvantage that the increase in its content results in impairment in the heat resistance of the glass. Accordingly, the content of $Li_2O$ preferably is 1% or lower and more preferably is substantially an impurity amount.

$Na_2O$ $Na_2O$ is an indispensable component for improving the strength of the glass, with its Na ions being substituted by other cations such as, for instance, K ions in molten salt.

When the content thereof is lower than 3%, the ion substitution does not occur to a sufficient degree. Hence, even when a chemical strengthening treatment is carried out, a satisfactory effect cannot be obtained. From this point of view, it is further preferable that the content of $Na_2O$ is at least 8%.

On the other hand, when the content of $Na_2O$ exceeds 18%, the heat resistance of the glass is impaired considerably. Accordingly, the content of $Na_2O$ is preferably 18% or lower. In order to secure the high heat resistance of glass more reliably, it is further preferable that the content of $Na_2O$ is 16% or lower.

$K_2O$

Like $Na_2O$, $K_2O$ is a component that improves meltability of the glass. When a total content of $Na_2O$ and $K_2O$ is at least 11%, the glass can be melted readily. Furthermore, $K_2O$ does not impair the heat resistance of the glass considerably as compared to $Na_2O$. Accordingly, when the total content of $Na_2O$ and $K_2O$ is 18% or lower, with the content of $Na_2O$ being 16% or lower, both the high meltability and high heat resistance can be obtained.

Generally, a molten salt of potassium nitrate is used as a chemical strengthening salt. Hence, when the content of $K_2O$ contained in the glass exceeds 3.5%, the ion exchange does not occur to a sufficient degree. Accordingly, a sufficiently great compression stress cannot be generated at the glass surface. Thus, it is preferable that the content of $K_2O$ is in the range of 0% to 3.5%. Preferably, the sum of $K_2O$ and $Na_2O$ is in the range of 11% to 18%.

MgO

MgO is a component that reduces the viscosity of the glass to improve the meltability thereof. MgO does not prevent the ion exchange from occurring in the chemical strengthening, which is advantageous. MgO, however, has a strong tendency to elevate the devitrification temperature of the glass. Hence, the content of MgO is preferably in the range of 0% to 15%, particularly 0% to 5%. From the viewpoint of maintaining the chemical properties of the glass, it is more preferable that the content of MgO is in the range of 2% to 5%.

CaO

CaO is an indispensable component for reducing the viscosity without exerting a significant adverse effect on the devitrification temperature of the glass. When compared with SrO providing effects that are similar to those of CaO, CaO can improve the meltability without preventing the ion exchange from occurring in the chemical strengthening. A CaO content less than 1% results in insufficient manifestation of its effect, whereas a CaO content exceeding 15% elevates the devitrification temperature of the glass to deteriorate the formability thereof. The content of CaO therefore is preferably in the range of 1% to 15%. In order that the glass can be chemically strengthened and high meltability of the glass can be secured, the content of CaO is preferably at least 3%. Further, in order to prevent the devitrification temperature of the glass from elevating, the content of CaO is preferably 7.5% or lower.

SrO

SrO has advantages in reducing the viscosity of the glass and preventing the devitrification temperature from elevating. SrO however inhibits an alkali component contained in the glass from migrating. Accordingly, the content of SrO exceeding 4.5% causes difficulty in the chemical strengthening. Furthermore, a large quantity of SrO contained in the glass increases the density of the glass. The content of SrO therefore is preferably in the range of 0% to 4.5%.

BaO

BaO has advantages in reducing the viscosity of the glass and preventing the devitrification temperature from elevating. However, BaO particularly inhibits an alkali from migrating in the glass. Accordingly, the increase in content of BaO makes it difficult to chemically strengthen the glass through the ion exchange. Furthermore, a glass containing a large quantity of BaO has an increased density. Moreover, a barium raw material is a poisonous substance and the handling thereof therefore is difficult. Accordingly, the content of BaO is preferably 1% or lower and more preferably is substantially an impurity amount.

$TiO_2$ $TiO_2$ is a component that improves the meltability without deteriorating the heat resistance of the glass. However, a $TiO_2$ content exceeding 2% elevates the devitrification temperature of the glass to deteriorate formability thereof.

Generally, raw materials for glass contain iron as an impurity. When iron and $TiO_2$ coexist in the glass, the glass is colored yellow. Hence, the glass containing $TiO_2$ is difficult to recycle. Accordingly, the content of $TiO_2$ is preferably 2% or lower, and more preferably is substantially an impurity amount.

$ZrO_2$ $ZrO_2$ is an indispensable component for improving the heat resistance of the glass. However, when the content of $ZrO_2$ is less than 1%, its effect cannot be obtained to a sufficient degree. On the other hand, a $ZrO_2$ content exceeding 5% makes it difficult to strengthen the glass satisfactorily. Furthermore, when the content of $ZrO_2$ exceeds 10%, the devitrification temperature of the glass elevates and thereby the formability thereof deteriorates. Accordingly, the content of $ZrO_2$ is preferably in the range of 1% to 10%, more preferably in the range of 1% to 5%, and particularly preferably in the range exceeding 1% but not higher than 5%.

The glass composition of the present invention may contain components other than those mentioned above, for example, $Sb_2O_3$, $As_2O_5$, $SO_3$, $SnO_2$, and F that is contained in a fluorine compound, which serve as glass clarifiers for defoaming in melting, transition metal compounds such as $Fe_2O_3$, CoO, and NiO for coloring the glass, and impurities originating from industrial raw materials for glass, with the content of each component being within the range not exceeding 0.5 mass %. The term "essentially" used in describing the glass composition A denotes that trace amounts of components whose contents each are in the range not exceeding 0.5 mass % are tolerated. Similarly, the above-mentioned phrase "substantially an impurity amount" also means an amount in the range not exceeding 0.5 mass %.

The ratios of the respective components that constitute the glass composition were determined individually with considerations given only to the characteristics of the respective components. Furthermore, the ratios of the respective components were adjusted so that the composition as a whole had desirable characteristics. As a result, it was found that the ratios of the present invention were the best.

The glass composition of the present invention has a glass transition temperature of at least 590° C. Accordingly, the properties thereof are not deteriorated even when, for instance, the glass substrate is heated in forming a magnetic recording layer thereon by sputtering. The glass composition therefore is suitable for the substrate for perpendicular magnetic recording media that is heated at particularly high temperatures. A higher glass transition temperature allows the treatment to be conducted at higher temperatures. Accordingly, the glass transition temperature is preferably as high as possible, but with consideration given to the practical range of the glass transition temperature, it is preferably 700° C. or lower.

The glass composition of the present invention has a thermal expansion coefficient of at least $70 \times 10^{-7}/°$ C. as measured in the range of −50° C. to 70° C. and a thermal expansion coefficient of at least $80 \times 10^{-7}/°$ C. as measured in the range of 50° C. to 350° C. Accordingly, even when the glass composition is bonded or joined to a metal material with a high thermal expansion coefficient such as stainless steel, the use thereof causes no cracks to be developed in the glass by the difference in expansion between the materials resulting from changes in temperature, and in turn no breakage to occur.

Furthermore, for example, even when magnetic recording media have narrowed recording tracks, a tracking error that is caused by the difference in thermal expansion between the glass and the metal structural material can be prevented or avoided from occurring. The glass composition of the present invention can have a thermal expansion coefficient that is substantially equal to that of the metal material and can have a higher thermal expansion coefficient than that of conventional glass. Hence, the upper limit of the thermal expansion coefficient is not particularly limited but the practical range thereof is preferably $110 \times 10^{-7}/°$ C. or lower as measured in the range of 50° C. to 350° C.

The glass composition of the present invention can be enhanced in strength by bringing it into contact with a molten salt containing monovalent cations whose ionic radius is larger than that of Na ions, at a temperature that is equal to or lower than the glass transition temperature, and thereby causing the ion exchange to give a compression stress to the glass surface. The molten salt may be, for example, potassium nitrate or a mixed salt of potassium nitrate and sodium nitrate. The composition therefore is suitable for a substrate that is used in a high-speed rotary HDD and is required to have considerable strength.

The glass substrate including the glass composition of the present invention can have sufficiently high strength even when having a reduced thickness. Accordingly, the substrate may be used as, for example, a substrate for a panel of a liquid crystal display, a reflector of a lamp to serve as a light source that is used in, for instance, liquid crystal projectors or other projectors, and a glass substrate for solar cells.

The method of producing a glass sheet using the float process according to the present invention may be carried out in the same manner as in the conventional float glass process that is used widely for producing glass sheets except that the raw materials for glass are blended so that the molten glass has the above-mentioned composition of the present invention.

EXAMPLES

Hereinafter, the present invention is described in detail using examples. Glasses having the glass compositions shown in Examples 1 to 6 that were those of the present invention were prepared through melting experiments. Thereafter, with respect to the glasses thus obtained, the melting temperature, the working temperature, the glass transition temperature, the thermal expansion coefficient, the specific gravity, the Young's modulus, and the load at which a crack develops with a probability of 50% were measured. The results are shown in Table 1. In addition, a glass disclosed in Example 1 of JP9-2836A was prepared through the melting experiment as Comparative Example 1. Furthermore, glasses free from $ZrO_2$ are shown in Table 2 as Comparative Examples 2 and 3.

The preparation of the glasses of Examples 1 to 6 and Comparative Examples 1 to 3 and the measurements of the properties of the resulting glasses were conducted according to the following procedures.

TABLE 1

| | | Ex. 1 | Ex. 2 | Ex. 3 | Ex. 4 | Ex. 5 | Ex. 6 |
|---|---|---|---|---|---|---|---|
| Composition (mass %) | $SiO_2$ | 64.5 | 60.5 | 61.5 | 61.5 | 64.0 | 61.8 |
| | $Al_2O_3$ | 10.0 | 12.1 | 12.1 | 12.1 | 10.3 | 10.4 |
| | $Li_2O$ | 0.0 | 0.0 | 0.0 | 0.0 | 0.0 | 0.0 |
| | $Na_2O$ | 13.6 | 14.5 | 12.9 | 12.9 | 14.4 | 13.7 |
| | $K_2O$ | 0.2 | 0.2 | 1.8 | 1.8 | 0.0 | 0.0 |
| | MgO | 2.2 | 4.3 | 2.8 | 3.7 | 2.9 | 2.9 |
| | CaO | 6.2 | 3.2 | 6.0 | 3.7 | 6.5 | 6.4 |
| | SrO | 0.4 | 1.3 | 0.0 | 2.4 | 0.0 | 0.0 |
| | BaO | 0.0 | 0.0 | 0.0 | 0.0 | 0.0 | 0.0 |
| | $TiO_2$ | 0.0 | 1.0 | 1.0 | 0.0 | 0.0 | 0.0 |
| | $ZrO_2$ | 3.0 | 3.0 | 2.0 | 2.0 | 2.0 | 4.9 |
| Melting Temperature (log η = 2) [° C.] | | 1572 | 1534 | 1558 | 1574 | 1534 | 1537 |
| Working Temperature (log η = 4) [° C.] | | 1123 | 1113 | 1113 | 1129 | 1095 | 1122 |
| Devitrification Temperature [° C.] | | 1095 | 1067 | 1099 | 1069 | 1076 | 1090 |
| Working Temperature − Devitrification Temperature [° C.] | | 28 | 46 | 14 | 60 | 19 | 32 |
| Glass Transition Temperature [° C.] | | 602 | 613 | 610 | 600 | 592 | 622 |
| α(50 to 350° C.) [×$10^{-7}/°$ C.] | | 84.5 | 87.1 | 87.4 | 86.8 | 87.3 | 87.9 |
| α(−50 to 70° C.) [×$10^{-7}/°$ C.] | | 72.7 | 71.9 | 72.4 | 71.4 | 72.8 | 74.6 |

TABLE 1-continued

|  | Ex. 1 | Ex. 2 | Ex. 3 | Ex. 4 | Ex. 5 | Ex. 6 |
|---|---|---|---|---|---|---|
| Specific Gravity [g/cm$^3$] | 2.53 | 2.56 | 2.53 | 2.62 | 2.53 | 2.57 |
| Young's Modulus [GPa] | 77 | 78 | 78 | 80 | 77 | 79 |
| Load at which a crack develops with a probability of 50% [g] | >2000 | 1800 | 1600 | >2000 | >2000 | 1100 |

* "Ex." denotes Example.

TABLE 2

|  |  | C. Ex. 1 | C. Ex. 2 | C. Ex. 3 |
|---|---|---|---|---|
| Composition (mass %) | SiO$_2$ | 58.0 | 64.3 | 63.3 |
|  | Al$_2$O$_3$ | 7.0 | 10.5 | 10.5 |
|  | Li$_2$O | 0.0 | 0.0 | 0.0 |
|  | Na$_2$O | 4.2 | 9.8 | 12.9 |
|  | K$_2$O | 6.3 | 2.2 | 0.0 |
|  | MgO | 2.0 | 3.2 | 3.2 |
|  | CaO | 4.8 | 5.9 | 6.0 |
|  | SrO | 6.9 | 4.1 | 4.1 |
|  | BaO | 7.9 | 0.0 | 0.0 |
|  | TiO$_2$ | 0.0 | 0.0 | 0.0 |
|  | ZrO$_2$ | 2.9 | 0.0 | 0.0 |
| Melting Temperature (log η = 2) [° C.] |  | 1545 | 1597 | 1536 |
| Working Temperature (log η = 4) [° C.] |  | 1145 | 1131 | 1091 |
| Devitrification Temperature [° C.] |  | 1070 | 1119 | 1093 |
| Working Temperature − Devitrification Temperature [° C.] |  | 75 | 12 | −2 |
| Glass Transition Temperature [° C.] |  | 615 | 605 | 591 |
| α(50 to 350° C.) [×10$^{-7}$/° C.] |  | 84 | 79 | 86 |
| α(−50 to 70° C.) [×10$^{-7}$/° C.] |  | 72 | 71 | 73 |
| Specific Gravity [g/cm$^3$] |  | 2.8 | 2.5 | 2.6 |
| Young's Modulus [GPa] |  | 76 | 77 | 77 |
| Load at which a crack develops with a probability of 50% [g] |  | 100 | 1200 | 1400 |

* "C. Ex." denotes Comparative Example.

Preparation of Glass Substrates for Magnetic Recording Media

First, using silica, alumina, lithium carbonate, sodium carbonate, potassium carbonate, basic magnesium carbonate, calcium carbonate, strontium carbonate, barium carbonate, titanium oxide, and zirconium oxide, which were common raw materials for glass, batches were prepared so as to have glass compositions shown in Tables 1 and 2. Each of the batches thus prepared was placed in a platinum crucible and was heated and maintained in an electric furnace at 1550° C. for four hours. Thus a molten glass was obtained. This was taken out of the furnace and then was poured on an iron sheet. This was cooled to form a glass block. This glass block was placed in the electric furnace again and was kept at 650° C. for 30 minutes. Thereafter, the furnace was switched off to allow it to cool slowly down to room temperature. Thus, each sample glass was obtained.

Each sample glass was processed into a column form having a diameter of 5 mm and a length of 15 mm. Thereafter, the thermal expansion coefficient and the glass transition temperature thereof were measured with a differential thermal expansion meter (Thermoflex TMA 8140, Rigaku).

Each sample glass was pulverized. The glass grains thus obtained were sifted through sieves, and those that had passed through a 2380-μm sieve but had stayed on a 1000-μm sieve were immersed in ethanol, were subjected to ultrasonic cleaning, and then were dried in a thermostat. Twenty-five grams of the glass grains were placed in a platinum boat having a width of 12 mm, a length of 200 mm, and a depth of 10 mm so as to attain a substantially uniform thickness. Thereafter, the platinum boat containing the glass grains therein was kept in an electric furnace having a temperature gradient of 930° C. to 1180° C. for two hours. Then, the glass grains were taken out of the furnace, and devitrification generated inside the glass was observed under a 40-power optical microscope. The highest temperature at which devitrification was observed was taken as the devitrification temperature.

The sample glass was cut into a doughnut shape having an outer diameter of 68 mm and an inner diameter of 20 mm. This then was ground with alumina abrasive grains and both faces of the glass further were mirror-polished (a surface roughness Ra: 2 nm or less, according to Japanese Industrial Standard (JIS) B 0601-1994) with cerium oxide abrasive grains. Thus, a 0.635-mm thick glass substrate (disk) for magnetic recording media was obtained.

This disk was washed with a commercial alkali detergent and then was immersed for 10 minutes in a molten salt of potassium nitrate heated to 440° C. and thereby a chemical strengthening treatment was carried out. The disk was washed again with the commercial alkali detergent. Thus, a substrate for magnetic recording media was completed.

Using a diamond indenter (quadrangular pyramid-indenter having an angle of 136 degrees between opposite faces) of a micro Vickers hardness tester (MVK-G2, AKASHI CORPORATION), a load of 50 to 2000 g was applied to a recording surface of the substrate, and the load causing a vertical crack to develop around the indentation with a probability of 50% was measured.

In this context, the "vertical crack" denotes a crack that is caused in the direction perpendicular to the glass surface and develops on the extension line of a diagonal line of the Vickers indentation having a square shape as its plan view.

The glass composition was analyzed using, for example, the wet chemical glass analysis in combination with the atomic absorption spectro-photometry.

The specific gravity was measured by the Archimedes method, and the Young's modulus was measured according to JIS R 1602 (the method for testing the elastic modulus of fine ceramics).

In all Examples of the present invention, the thermal expansion coefficient as measured in the range of −50° C. to 70° C. was within the range of $70×10^{-7}$/° C. to $77×10^{-7}$/° C., that is, at least $70×10^{-7}$/° C.

As shown in Tables 1 and 2, the glasses of Examples 1 to 6 of the present invention each have a glass transition temperature of at least 590° C. and thus high heat resistance. Accordingly, they are excellent as members that are used at high temperatures or are subjected to high-temperature processes.

In Examples 1 to 6 of the present invention, the load at which a crack develops with a probability of 50% in the glass is at least 1000 g, which is heavier than that in the glass of Comparative Example 1 disclosed as a high heat-resistant glass. This reveals that the glasses having the glass compositions of the present invention not only have high heat resistance but also can be chemically strengthened, and as a result of the chemical strengthening, they have high mechanical strength.

On the other hand, the glass of Comparative Example 1 has a glass transition temperature as high as 615° C. and thus high heat resistance. However, the load at which a crack develops with a probability of 50% is as low as 100 g. Thus, the glass cannot be provided with sufficiently high mechanical strength (crack resistance) through chemical strengthening.

The glass of Comparative Example 2 has a high glass transition temperature, specifically 605° C. In addition, the load at which a crack develops therein with a probability of 50% is 1200 g. The glass, however, has a melting temperature as high as 1597° C. Thus, the glass has a problem in meltability as compared with the glass of the present invention.

The glass of Comparative Example 3 has a high glass transition temperature, specifically 591° C., and the load at which a crack develops therein with a probability of 50% is 1400 g. In addition, the melting temperature thereof is 1536° C. and thus it can be melted readily. However, the devitrification temperature thereof is substantially equal to the formation temperature (working temperature), which causes difficulty in formation thereof Ease of glass formation improves with the increase in the difference between the working temperature and the devitrification temperature. Hence, the value obtained by the deduction of the devitrification temperature from the working temperature was used as an index of formation easiness. The values of (the working temperature—the devitrification temperature) of the respective glasses are shown in Tables 1 and 2.

In the glass of Comparative Example 3, the value of (the working temperature—the devitrification temperature) is −2° C. Hence, it can be said that the glass is difficult to form as compared to the glasses of the examples according to the present invention. On the other hand, the glasses of the examples according to the present invention have a relationship of (the working temperature>the devitrification temperature). Hence, it can be said that they are easier to form.

Glass compositions with a glass transition temperature of at least 590° C. may have a melting point around 1600° C. in some cases. In the examples of the present invention, however, the glass compositions have a melting temperature of 1574° C. or lower while having a glass transition temperature of at least 590° C. Thus, their vitrification is easier.

Production of Magnetic Recording Media

Next, using the glass substrates for magnetic recording media having the glass compositions of Example 1 and Comparative Example 1, magnetic recording media were produced in the following manner. Each sample glass was cut into a doughnut shape having an outer diameter of 68 mm and an inner diameter of 20 mm. Then, end faces of the inner and outer circumferences were polished and both faces to serve as recording surfaces were ground with alumina abrasive grains and then were mirror-polished (a surface roughness Ra: 2 nm or less, according to JIS B 0601-1994) using abrasive grains containing cerium oxide as their main component. Thus, a 0.635-mm thick glass was obtained. In this connection, the sequence of the polishing processes described above can be changed.

These glass substrates were washed with a commercial alkali detergent. Thereafter, the glass substrate of Example 1 was immersed for four hours in a molten salt of potassium nitrate heated to 380° C. to be chemically strengthened. This then was washed again with the commercial alkali detergent. The glass substrate of Comparative Example 1 was washed with the commercial alkali detergent. Thereafter, it was immersed for four hours in a molten salt to be chemically strengthened and then was washed with the commercial alkali detergent. The molten salt was prepared by heating a mixed salt containing, in terms of mass %, 60% of potassium nitrate and 40% of sodium nitrate to 380° C.

The glass substrates thus obtained were heated to 400° C. and then a Cr film, a Co—Cr—Ta alloy film, and a carbon film were formed sequentially thereon as an undercoat layer, a recording layer, and a protective layer, respectively, by sputtering. Further, a perfluorocarbon-based lubricating oil was applied to the protective layer to complete each magnetic recording medium.

The magnetic recording media thus obtained each were subjected to a rotational driving test using a closed-type test device based on a HDD. In the rotational driving test, each magnetic recording medium was fitted and fixed on a stainless steel rotational shaft having a radius somewhat smaller than that of an inner circumference of the magnetic recording medium, and was rotated at 416.7 revolutions per second (25,000 rpm). As a result, damage occurred during the rotation in the magnetic recording medium produced with the glass of Comparative Example 1. This revealed that it had not been provided with sufficiently high strength through the chemical strengthening. On the other hand, such damage did not occur in the magnetic recording medium of Example 1.

Next, the magnetic recording media each were subjected to a fixed-point floatation test and a continuous seek test. The fixed-point floatation test was conducted under a reduced pressure of 26.7 kPa (200 torr) for 24 hours. Thereafter, they were examined under an optical microscope whether the head crash had occurred or not. The continuous seek test was conducted for 1000 hours under the conditions including a flying height of 15 nm and a rotation speed of 166.7 revolutions per second (10,000 rpm). Then they were examined under an optical microscope whether the head crash had occurred or not. For the magnetic recording media produced using the glass substrates obtained from the sample glasses of Example 1 and Comparative Example 1, no head crashing error occurred.

Furthermore, the magnetic recording medium produced using the glass substrate obtained from the sample glass of Example 1 exhibited a favorable load-unload durability (ramp-load durability).

Conceivably, since the sample glasses of Example 1 and Comparative Example 1 have high heat resistance, the warping, thermal relaxation, and deposition of alkaline components described earlier do not occur in heating the glasses, and the head crashing error therefore tends not to occur.

Furthermore, when the recording head flies very low over the magnetic recording surface or momentarily touches it and runs thereon while flying, the presence of minute projections on the glass surface causes more frictional heat to be generated. Since this heat produces thermal noises, a surface with less minute projections and higher smoothness is preferable.

The invention may be embodied in other forms without departing from the spirit or essential characteristics thereof The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A glass substrate for magnetic recording media, having a circular outer shape in a plan view and comprising a glass composition,
    wherein the glass composition comprises, in terms of mass %:
    59 to 68% of $SiO_2$;
    9.5 to 15% of $Al_2O_3$;
    0 to 1% of $Li_2O$;
    3 to 18% of $Na_2O$;
    0 to 3.5% of $K_2O$;
    0 to 15% of MgO;
    1 to 15% of CaO;
    0 to 4.5% of SrO;
    0 to 1% of BaO;
    0 to 2% of $TiO_2$; and
    more than 1% but not more than 10% of $ZrO_2$.

2. The glass substrate for magnetic recording media according to claim 1, wherein the glass composition consists essentially of, in terms of mass %:
    60 to 65% of $SiO_2$;
    9.5 to 15% of $Al_2O_3$;
    8 to 16% of $Na_2O$;
    0 to 3.5% of $K_2O$;
    2 to 5% of MgO;
    3 to 7.5% of CaO;
    0 to 4.5% of SrO; and
    exceeding 1% but not higher than 5% of $ZrO_2$,
    wherein the sum of $Na_2O$ and $K_2O$ is in a range of 11% to 18%.

3. A magnetic recording medium comprising:
    a glass substrate having a circular outer shape in a plan view and comprising a glass composition; and
    a recording layer formed on the glass substrate,
    wherein the glass composition comprises, in terms of mass %:
    59 to 68% of $SiO_2$;
    9.5 to 15% of $Al_2O_3$;
    0 to 1% of $Li_2O$;
    3 to 18% of $Na_2O$;
    0 to 3.5% of $K_2O$;
    0 to 15% of MgO;
    1 to 15% of CaO;
    0 to 4.5% of SrO;
    0 to 1% of BaO;
    0 to 2% of $TiO_2$; and
    More than 1% but not more than 10% of $ZrO_2$.

4. The magnetic recording medium according to claim 3, wherein the glass composition consists essentially of, in terms of mass %:
    60 to 65% of $SiO_2$;
    9.5 to 15% of $Al_2O_3$;
    8 to 16% of $Na_2O$;
    0 to 3.5% of $K_2O$;
    2 to 5% of MgO;
    3 to 7.5% of CaO;
    0 to 4.5% of SrO; and
    more than 1% but not more than 5% $ZrO_2$,
    wherein the sum of $Na_2O$ and $K_2O$ is in a range of 11% to 18%.

* * * * *